(12) United States Patent
Brooker et al.

(10) Patent No.: US 11,733,473 B2
(45) Date of Patent: Aug. 22, 2023

(54) HIGH PRECISION STABLE OPTICAL ALIGNMENT AND CONFIGURATION

(71) Applicant: CELLOPTIC, INC., Rockville, MD (US)

(72) Inventors: Gary Brooker, Rockville, MD (US); Nisan Siegel, Rockville, MD (US)

(73) Assignee: CELLOPTIC, INC., Rockville, MD (US)

( * ) Notice: Subject to any disclaimer, the term of this patent is extended or adjusted under 35 U.S.C. 154(b) by 411 days.

(21) Appl. No.: 16/758,594

(22) PCT Filed: Oct. 24, 2018

(86) PCT No.: PCT/US2018/057279
§ 371 (c)(1),
(2) Date: Apr. 23, 2020

(87) PCT Pub. No.: WO2019/084115
PCT Pub. Date: May 2, 2019

(65) Prior Publication Data
US 2021/0191062 A1     Jun. 24, 2021

Related U.S. Application Data

(60) Provisional application No. 62/576,178, filed on Oct. 24, 2017.

(51) Int. Cl.
*G02B 7/00*     (2021.01)
*G02B 21/00*    (2006.01)
(Continued)

(52) U.S. Cl.
CPC .......... *G02B 7/003* (2013.01); *G02B 21/008* (2013.01); *G02B 21/361* (2013.01);
(Continued)

(58) Field of Classification Search
CPC ........ G02B 7/003; G02B 21/361; G02B 7/00; G02B 7/004; G02B 7/005; G02B 7/006;
(Continued)

(56) References Cited

U.S. PATENT DOCUMENTS 5,194,993 A      3/1993  Bedzyk
2009/0316284 A1  12/2009 Kim et al.
(Continued)

FOREIGN PATENT DOCUMENTS

| CN | 107329230 A | * | 11/2017 | ............. G02B 7/023 |
| CN | 109891293 A | * | 6/2019  | ............. G02B 7/02  |
| WO | WO-9306514 A1 | * | 4/1993  | ............. G02B 7/00 |

OTHER PUBLICATIONS

International Search Report and Written Opinion of the ISA for PCT/US2018/057279, dated Feb. 25, 2019, 15 pages.

*Primary Examiner* — Arnel C Lavarias
(74) *Attorney, Agent, or Firm* — Nixon & Vanderhye, PC

(57) ABSTRACT

An optical apparatus includes a plurality of lenses including a first lens affixed to an optics mount holder which is adjustably affixed to an alignment channel part. The optical axis of the first lens passes through a hollow area of the alignment channel part. The lens is mounted on the optics mount holder which is adjustably affixed to one end of the alignment channel part with a plurality of adjustable fasteners. A method is provided for aligning the optical apparatus.

15 Claims, 14 Drawing Sheets

(51) Int. Cl.
*G02B 21/36* (2006.01)
*G03H 1/00* (2006.01)
*G03H 1/04* (2006.01)

(52) U.S. Cl.
CPC ............ *G03H 1/0005* (2013.01); *G03H 1/041* (2013.01); *G03H 1/0443* (2013.01); *G03H 2001/005* (2013.01); *G03H 2223/20* (2013.01)

(58) Field of Classification Search
CPC .......... G02B 7/02; G02B 7/021; G02B 7/022; G02B 7/023; G02B 7/025; G02B 7/026; G02B 7/18; G02B 7/1805; G02B 7/182; G02B 7/1822; G02B 7/1824; G02B 7/1825; G02B 7/1827; G02B 7/1828; G02B 7/198; G02B 21/362; G03H 1/0005; G03H 1/041; G03H 1/0443; G03H 2001/005; G03H 2223/20
USPC ....... 359/822, 811, 813, 819, 821, 823, 824, 359/825, 826, 827, 828, 829, 830, 831, 359/871, 872, 894, 503, 506, 489.2, 1, 35
See application file for complete search history.

(56) References Cited

U.S. PATENT DOCUMENTS

2012/0154926 A1 6/2012 Shinohara
2016/0357146 A1 12/2016 Brooker et al.

\* cited by examiner

HIGH PRECISION STABLE OPTICAL ALIGNMENT AND CONFIGURATION

CROSS-REFERENCE TO RELATED APPLICATIONS

This application is the U.S. national phase of International Application No. PCT/US2018/057279 filed 24 Oct. 2018, which designated the U.S. and claims the benefit of priority to U.S. Provisional Application Ser. No. 62/576,178 filed on Oct. 24, 2017, the entire contents of each of which are hereby incorporated by reference.

TECHNICAL FIELD

This disclosure relates to optical alignment in microscopes and other optical lens arrangements.

BACKGROUND

Components from Thorlabs Inc. (www.thorlabs.com) are typical of parts and equipment used in conventional optical alignment methods. Some example components used in conventional optical alignment systems are shown in FIGS. 13A-13D. Conventional components such as those shown in FIGS. 13A-13D suffer from many deficiencies when used in very high precision optical instruments, such as, for example, holographic microscopes that require very precise alignment of the optics (e.g., to within 10 microns or less in XYZ dimensions). Limitations of conventional systems such as that shown in FIGS. 13A-13D, which were bulky and which often failed to maintain alignment over extended periods (e.g. days, weeks, months, years), were among the reasons for the inventors to seek new solutions for achieving precise alignment in optical systems in an efficient and reliable manner.

SUMMARY OF EXAMPLE EMBODIMENTS OF THE INVENTION

Certain example embodiments described herein relate to techniques for aligning and configuring optical equipment including, but not limited to, holographic microscopes and other types of microscopes.

According to an embodiment, an optical apparatus comprising a plurality of lenses including a first lens affixed to an optics mount holder which is adjustably affixed to an alignment channel part is provided. The optical axis of the first lens passes through a hollow area of the alignment channel part. The plurality of lenses are configured to: receive electromagnetic radiation from an object, wherein the electromagnetic radiation is incoherent light, coherent light, or any other electromagnetic radiation; transform, by transmission using the first lens, the received electromagnetic radiation to generate two or more differentially modulated electromagnetic waves propagating in a common path, wherein the first lens is a birefringent lens; and provide for the differentially modulated electromagnetic waves to create electromagnetic interference, wherein the electromagnetic interference captured by a camera is used to generate a hologram of the object.

According to another embodiment, an optical component for use in an optical apparatus is provided. The optical component comprises: an alignment channel part; an optics mount holder; a lens; and a railing. The lens is mounted on the optics mount holder which is adjustably affixed to one end of the alignment channel part with a plurality of adjustable fasteners, and the alignment channel part is affixed to the railing.

According to another embodiment, a method is provided for aligning an optical system comprising a first lens mounted on an optics mount holder that is adjustably affixed by a plurality of adjustable fasteners to an alignment channel part such that an optical axis of the first lens passes through a hollow area of the alignment channel part. The method comprises: initially performing the adjustable fixation of the optics mount holder to the alignment channel part such that the optics mount holder is movable in relation to the alignment channel part; gradually moving the initially affixed optics mount holder in relation to the alignment channel part to align the optical axis; and finally affixing the moved optics mount holder to the alignment channel part by adjusting the plurality of adjustable fasteners such that the optics mount holder is rendered immovable in relation to the alignment channel part.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
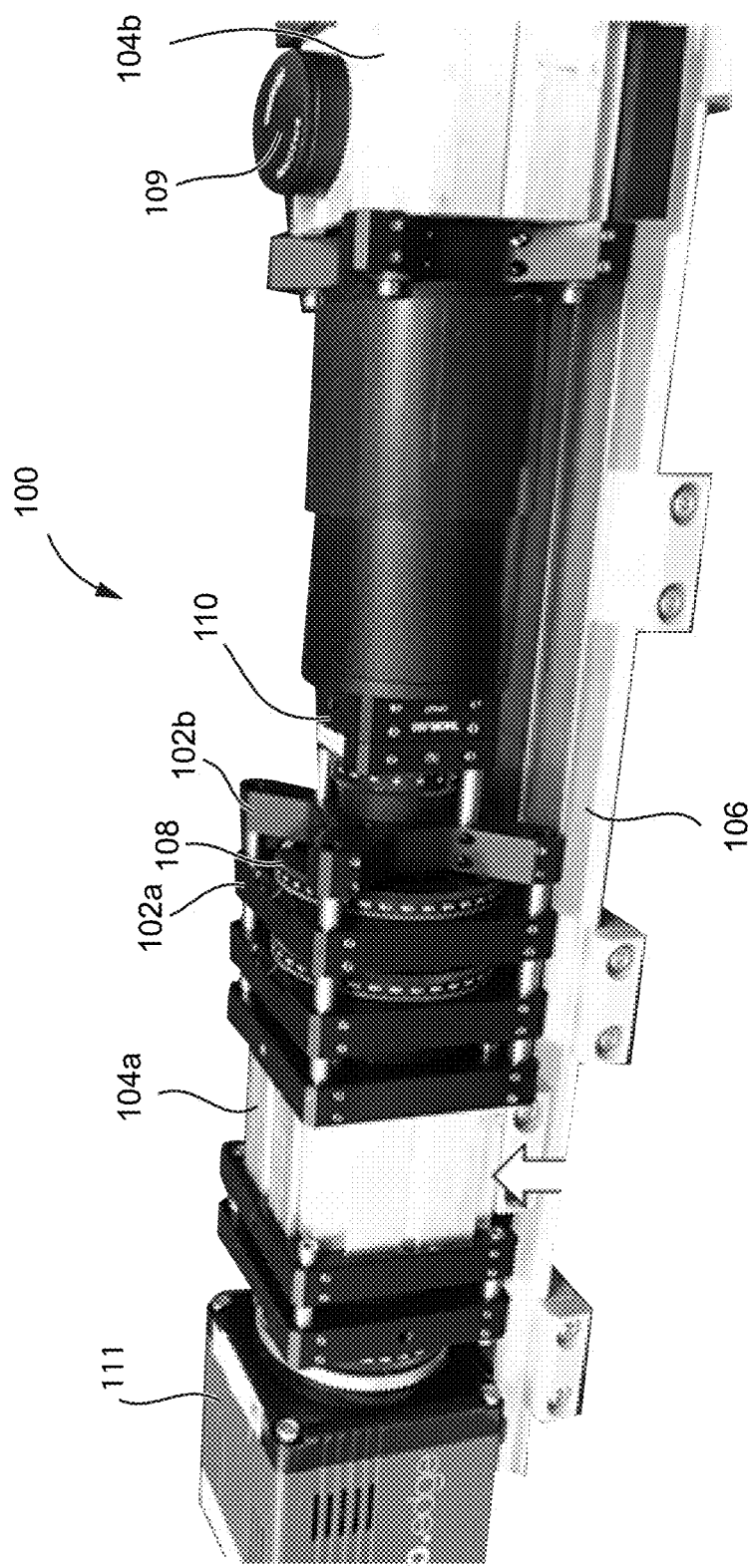
FIG. 1 shows an example optical system utilizing the stable alignment and configuration according to some embodiments.

High precision optical equipment such as, but not limited to, holographic microscopes, require highly accurate optical alignment. Many such high precision optical equipment include arrangements of multiple lenses along one or more optical axes. Example embodiments of the invention described herein overcome limitations of conventional systems and techniques for optical alignment and fabrication.

Some limitations of conventional systems were described above. Additionally, in conventional techniques such as that shown in FIGS. 13A-13D, components used for alignment are often relatively large or bulky, and would often fail to maintain alignment over extended periods of time due to the configuration and makeup of connectors (e.g., metal connecting rods) between multiple lenses. Moreover, in many conventional systems optical alignment components remain active in the optical apparatus after alignment configuration is completed, thus consuming additional space. Furthermore, since alignment components are always present in the conventional systems, accidental tampering with the optical alignment can occur. Continued easy access to the alignment components even after the apparatus is operational and in use, may also facilitate intentional tampering in conventional systems. Still further, in a conventional optical apparatus, the optical positions are maintained by components that can change position due to deformation of springs, the flexibility of connecting components and other environmental factors. Some of the many components available from the conventional systems are shown in FIGS. 13A-13D. Precise plane parallelism between optical components, such as that required for holographic microscopes and the like, is difficult to achieve in the conventional systems on a reproducible basis and must be established, if at all, on a case by case basis.

Embodiments of the subject invention provide novel systems and techniques for optical alignment and configuration. Example embodiments provide for an optical apparatus, such as, but not limited to, a holographic microscope, that is substantially smaller than comparable conventional systems. For example, whereas conventional lens holders for use in microscopes and the like that require fine adjustment were larger at about 3 inches wide by 4 inches tall by 3 inches thick, optics mount holders according to example embodiments are substantially smaller at about 1.5 inches thick by 2.5 inches wide by 3 inches tall. Moreover, example embodiments minimize or eliminate parts that can cause loss of alignment and the like over time. For example, example embodiments do not maintain optical positions in the apparatus by components that can change position due to deformation of springs, the flexibility of connecting components and other environmental factors. Moreover, in some embodiments, the optical components used to achieve optical alignment are removed from the optical apparatus once alignment is achieved, and the apparatus is locked down so no further movement of components can be made. Furthermore, since alignment components are not always present in the example embodiments, the possibility of tampering with the optical alignment is reduced or eliminated. Plane parallelism in some embodiments can be achieved based solely on readily available and reproducible precision machined surfaces, while some embodiments may provide stable adjustable angular alignment either from machined surfaces and/or precision adjusting screws.

In example embodiments, the optics are mounted in "optics mount holders" that are designed to accept one or more types and sizes of optics. An optic that is held by one of the optics mount holders may be a lens, a prism, a mirror, a waveplate, a polarizer, a grating, a mask, an iris, an aperture, a diffuser, or any other type of optic. The surfaces of the optic mount holders are plane parallel to one another and have oversize clearance holes (e.g., either square, rectangular or round) for screws to pass through in order to firmly mount to plane parallel "alignment channels" (by being screwed into threaded holes in the alignment channel parts) that are mounted on an "optics rail" which can accept a multitude of optics mount holders. During optical alignment, the optics mount holder can be moved in the x-y position either manually, or as described with a removable precision "adjustment device" such as, for example, an "x-y micrometer mover". During the alignment process, the state of the alignment may be monitored by viewing with the eye or by use of a digital camera or beam profiler or wave-front sensor. For example, prior to installing the optic to be aligned, a laser beam may be introduced into the optical system centered on the system optical axis, terminating at a display screen or digital camera or the like. The optic may then be installed, and the deviation of the laser beam from its original position on the screen or digital camera image may be observed. The alignment of the optic may then be adjusted in the x-y positions until the beam returns to its original position on the screen or camera image, or until the beam reaches any other desired location. During the alignment process, the screws which attach the optics mount holder to the alignment channel are lightly tightened against the alignment channel, optionally with washers between the screws and the optics mount holder, so that the optics mount holder can be gently moved in the x-y direction. In order to prevent the optics mount holder from moving during the alignment process the screws are slightly tightened against an optional spring washer to provide sufficient resistance to prevent movement. Once aligned, the screws are firmly tightened against the alignment channel.

The new alignment system for optical components allows for ready lateral xyz and theta centration of lenses and optical components using only one component that is free of springs after alignment, that can be reversibly locked down to stably maintain the position of the optical component after adjustment, which provides integrated light blocking, and which can be stably adjusted in x-y-z and theta axis. The new optical alignment system overcomes limitations of conventional systems for lens alignment. The new optical alignment system has been used in very exacting optical alignment systems such as optics to create holograms and pixel-perfect alignment of 2 or more CCD or sCMOS cameras. In the new optical system, undesired tip and tilt of lenses can be eliminated because all optics are perfectly plane parallel as a result of machined parts used in the system. If so desired, machined parts can be incorporated into the system to tip and tilt optical components at any desired angle. Alignment hardware is removable leaving permanently aligned optics that may however be realigned at a later date by replacing the alignment hardware, if desired. The new system eliminates bulky components allowing closer spacing of optical components yet stably maintains optical components and thus optical alignment. The new system is compact and free of springs for xyz and theta alignment, and then permanent positioning that does not rely on spring tension to maintain positions.

FIG. 1 illustrates an example camera system 100 according some embodiments. The camera system 100 may be a holographic microscope or camera that can be used to generate a holographic representation of a sample. Although in this description, holographic camera systems 100 and their integral lenses are primarily described, embodiments may include any type of optical devices beyond lenses and any type of optical system that requires fine adjustments.

The camera system 100 comprises a plurality of optics mount holders 102 (two optics mount holders 102a and 102b are specifically identified in FIG. 1). As will be described in relation to subsequent figures, optics mount holders 102 may each have an attached lens (or other optic) 108. Each optics mount holder may be either attached to an alignment channel 104 or another optics mount holder. In FIG. 1 two alignment channels 104a and 104b that are mounted in the optics rail 106 are identified. Alignment channel 104a has an optics mount holder 102 attached to each surface. Alignment channel 104b is designed to host an optical component located in the hollow area of that alignment channel. The optical component mounted inside of the alignment channel may be adjusted for alignment etc., using an attached knob 109 or the like which can be reached from outside of the alignment channel. For example, a user or operator of the microscope 100 may manually turn the knob 109 to turn the optic inside of the alignment channel 104b while adjusting the optical alignment of the various lenses in the microscope. In some embodiments, the knob 109 may be fixed (not adjustable) and may merely hold the optic positioned inside the alignment channel in place.

Embodiments are not limited to any particular types or numbers of alignment channels 104, optics mount holders 102, lenses 108 or other optical devices etc. that can be arranged on one or more optics rails 106. Embodiments are also not limited to microscopes or holographic microscopes, and may include any other type of optical apparatus where a plurality of optical components are arranged along one or more optical axes.

The optical components arranged on the rail may facilitate the transmission of electromagnetic radiation, such as, but not limited to, incoherent or coherent light from a sample object entering through an objective (not shown), which, after passing through the plurality of optics arranged on the optics rail, generates electromagnetic interference that is captured by a camera 111. The camera captured images are then provided to a computer (not shown), which generates a holographic representation of the sample.

According to some embodiments, the camera system 100 may also include one or more optics that are configured and/or aligned using conventional systems and techniques.

Figures 2, 3:
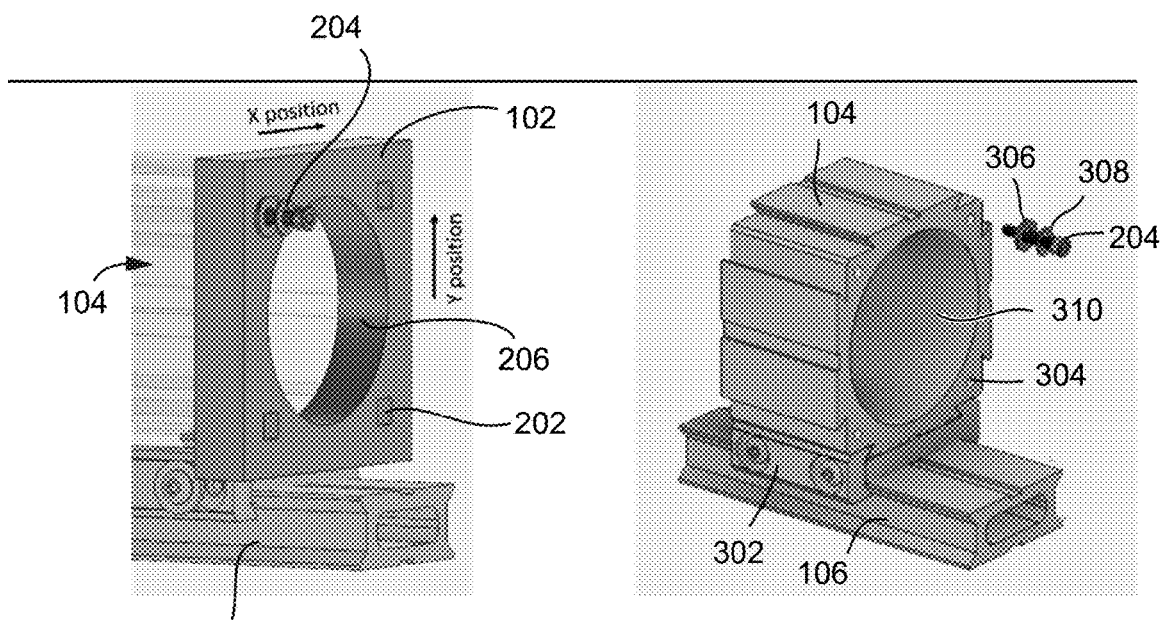
FIG. 2 shows an example optic mount holder according to some embodiments.
FIG. 3 shows an example alignment channel on which optic mount holders such as that shown in FIG. 2 are mounted, according to some embodiments.

FIG. 2 illustrates an optics mount holder 102, such as any of optics mount holders 102a or 102b shown in FIG. 1, which is mounted on an alignment channel 104, such as any of alignment channels 104a and 104b shown in FIG. 1, according to some example embodiments. FIG. 2 also illustrates that the alignment channel 104 is affixed to the optics rail 106.

The optics mount holder 102 is configured with oversize clearance holes 202 to allow adjustment of x-y position and eventual locking down to the alignment channel 104 with screws 204. In some embodiments, the optics mount holder 102 may be configured with four oversized holes 202, each capable of accommodating a screw 204 with which the optics mount holder is affixed to the alignment channel. In the illustrated embodiment, the holes 202 are arranged in the four corners of the square-shaped optics mount holder 102. However, in other embodiments, another number (e.g., 2, 3, 5, 6, etc.) holes for receiving screws may be arranged in any part of the optics mount holder that affixes to a surface of the alignment channel.

The optics mount holder 102 includes hollow area 206, which is where an optic such as, but not limited to, a lens is attached. In some embodiments, the hollow area 206 may be sized to exactly correspond to the hollow tunnel 310 (see FIG. 3) of the corresponding alignment channel to which the optics mount holder attaches. Although the illustrated hollow area 206 is of a circle/round shape, in some other embodiments, the hollow area may be of any other shape, such as, for example, square, rectangular, circular, etc. The inner rim of the hollow area may be threaded to allow threading in of a lens or other optic.

The optics mount holder 102 is constructed from a material and in dimensions that do no not get affected by environmental factors such as heat, cold and humidity under certain conditions. In some embodiments, the optics mount holder 102 is constructed from plastics, but other materials, or a compound of several materials may also be used. In some embodiments, the height, width and thickness of the optics mount holder are 70 mm, 70 mm and 12.7 mm respectively. This may not be required, but the optics mount holder should be slightly taller and wider than the alignment channel in order to allow for the clearance holes 202 to be drilled in the optics mount holder.

FIG. 3 illustrates an alignment channel 104, such as that shown in FIG. 2 but without an affixed optics mount holder, attached to an optics rail 106 with locking clamp 302. FIG. 3 shows threaded holes 304 configured on a surface of the alignment channel, surrounding a hollow space (a hollow tunnel) 310 that extends from end to end of the alignment channel. Each threaded hole 304 is configured to receive a screw 204. In the illustrated embodiment, the alignment channel surface to which the optics mount holder is to be attached has 4 configured holes 304 to receive screws 204. When a screw 204 is used to affix an optics mount holder to the alignment channel 104, the screw 204 may be used in combination with a flat washer 306 and spring washer 308. The flat washer ensures a stable grip for the screw to press the holder into the alignment channel, and also to ensure that the screw does not slip inside the clearance hole 202. The spring washer allows the screw to be loosened slightly to enable restrained, controlled movement of the holder, while the tension of the spring washer keeps the holder from moving too freely without any restraint.

The screw 204, spring washer 308 and flat washer 306 assembly loosely attach to the alignment channel to hold the optics mount holder in place while the alignment is performed by moving the optics mount holder in the x-y directions and/or by tilting, and then firmly attaches when the alignment is completed. In an example embodiment, the optics mount holder is loosely attached to the alignment channel when the screw assemblies affixing the optics mount holder to the alignment channel are tightened only partially while still allowing for motion of the optics mount holder relative to the alignment channel. When alignment is completed, the screws 204 may be tightened all the way such that any movement of the optics mount holder relative to the alignment channel is prevented.

The hollow tunnel 310 may run from end to end in the alignment channel, forming openings on either side of the alignment channel. Although the illustrated hollow tunnel 310 is of a circle/round shape, in some other embodiments, the hollow area may be of any other shape, such as, for example, square, rectangular, circular, etc.

The alignment channel 104 is configured such that it can be locked in relation to a rail 106 with the locking clamp 302. For example, a groove running on each side (left and right) just above the bottom surface of the alignment channel may be designed to accommodate an edge of the locking clamp. The locking clamp 302 may be designed with an edge fitting into each of the alignment channel 104 and the rail 106. One or more screws may adjustably affix the locking clamp to the alignment channel and/or rail, such that when the screw(s) are completely tightened all movement of the alignment channel in relation to the rail is disabled. The alignment channel 104, in some embodiments, may also be configured to accommodate another device (e.g. the adjustment apparatus 500 shown in FIG. 5 below) on its top surface by another locking clamp in a manner similar to its attachment to the rail.

The locking clamp 302, once affixed enables the alignment channel 104 to be moved along the rail 106. When the position of the alignment channel along the rail 106 is determined to be at the desired location, the locking clamp 302 can be affixed to the rail 106 by tightening one or more screws so that no further movement of the alignment channel or locking clamp in relation to the rail 106 is possible.

In the illustrated embodiment, screws 204 are used for affixing the optics mount holder 102 to the alignment channel 104. In some other embodiments, instead of one or more screws, some other type of fastener or bolt may be used. Other examples of fasteners may include fasteners that use some kind of epoxy or other glue, or a pin or nail that might be driven into the alignment channel.

The alignment channels are machined to a fine precision level such that perfect alignment and perfect parallel arrangements are made possible. In some example embodiments, surfaces of the alignment channel are plane parallel to within 1 thousandth of an inch. The alignment channel 104 is constructed from a material and in dimensions that do no not get affected by environmental factors such as heat, cold and humidity under certain conditions. In some embodiments, the alignment channel 104 is constructed from aluminum, but other materials, or a compound of several materials may also be used. As described elsewhere in this documents, an optical apparatus may include alignment channels of several sizes so as to accommodate spacing requirements, focal point distances, etc. of the optical arrangements.

Figures 4, 5:
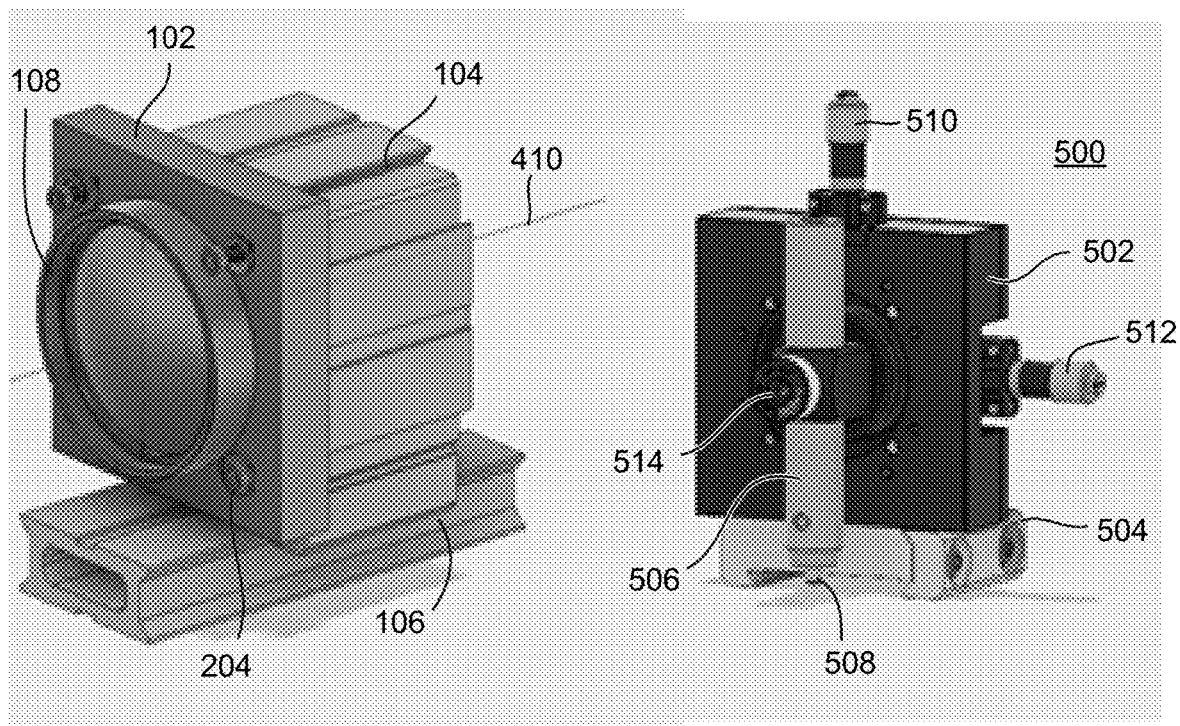
FIG. 4 shows an alignment channel with a mounted optics mount holder, according to some embodiments.
FIG. 5 shows an example micrometer adjustment unit that can be used to precisely adjust lens positions according to some embodiments.

FIG. 4 illustrates an optics mount holder 102 and alignment channel 104 assembly, as shown, for example, in FIG. 2, but now with an optics element 108 attached. The optics element 108 may be a lens.

FIG. 4 also shows one of the screws 204 in a state of being tightly affixed to the optics mount holder and the alignment channel, and the two top screws 204 being in a state of being loosely affixed. FIG. 4 also illustrates an optical axis 410 of the lens 108, and how it extends through the hollow tunnel 310 (see FIG. 3) of the alignment channel 104.

FIG. 5 illustrates an adjustment device 500, according to some embodiments. The adjustment device 500 may be used to adjust the optics mount holder 102 by moving it in the x and/or y directions in relation to the alignment channel's surface to which it is affixed.

In some embodiments, the adjustment device 500 is an X-Y micrometer assembly. The X-Y micrometer assembly may include a main adjuster body 502, an x-direction adjustment control 512, and a y-direction adjustment control 510. The assembly 500 may also include an adjustable shaft 506, a bolt 508 and an adjustment control 514 for the bolt 508. According to some embodiments, when the adjustment device 500 is attached to an alignment channel by a locking clamp 504, the bolt 508 is controlled so that it attaches to the optics mount holder which is loosely affixed to that alignment channel and is ready to be move in x- and/or y-directions.

Figure 6A:
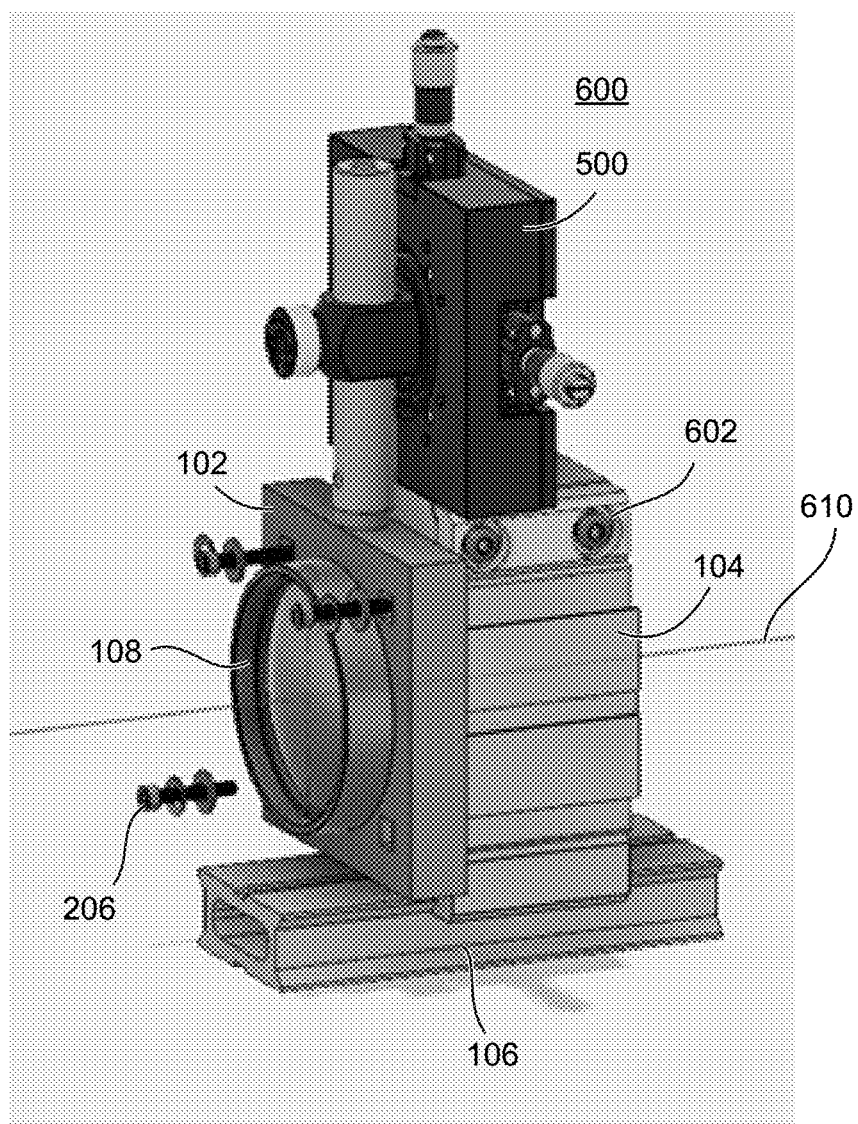
FIG. 6A shows an example optics alignment assembly including a lens and the attached micrometer adjustment unit, according to some embodiments.
Figure 6B:
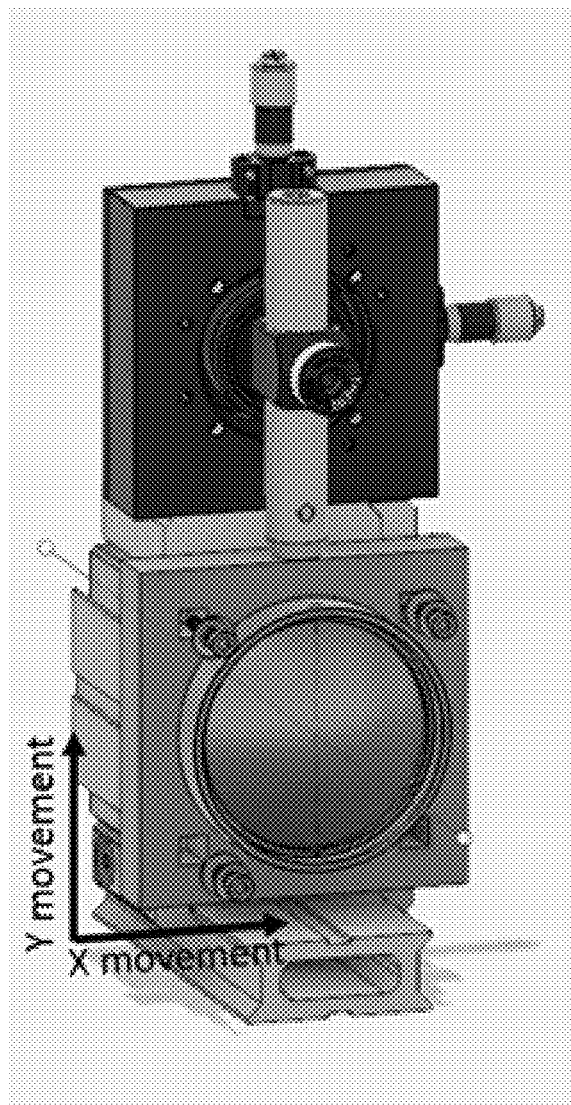
FIG. 6B illustrates another view of the optics alignment assembly of FIG. 6A.
Figure 6C:
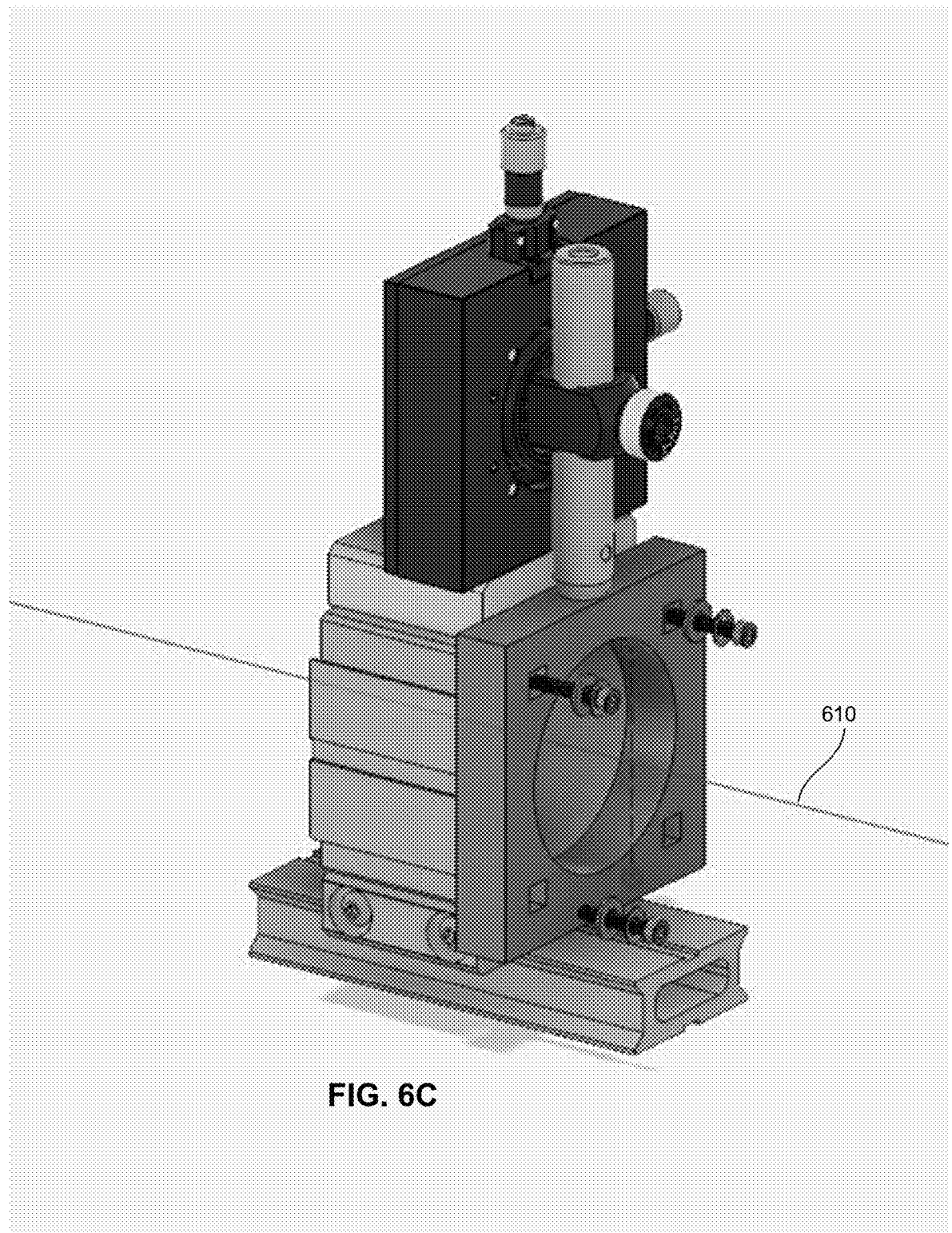
FIG. 6C illustrates another view of the optics alignment assembly of FIG. 6A but with the lens removed.
Figure 7A:
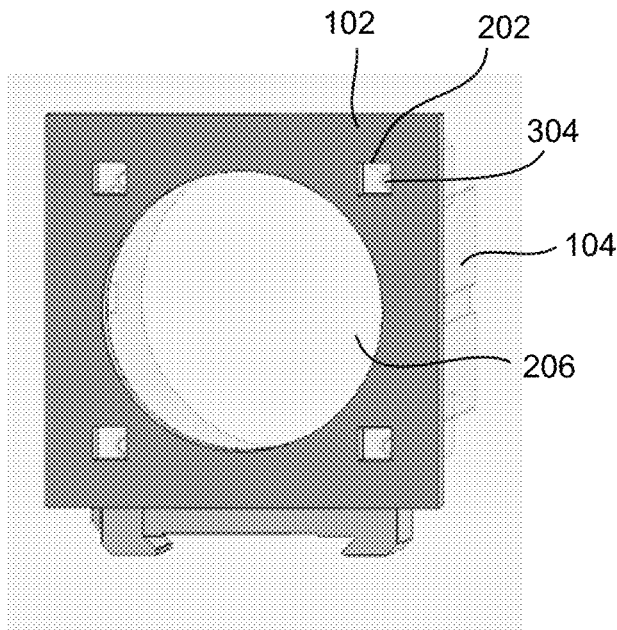
FIG. 7A-7D shows optics mount holders at different positions in relation to the corresponding alignment channel, according to some embodiments.
Figure 7C:
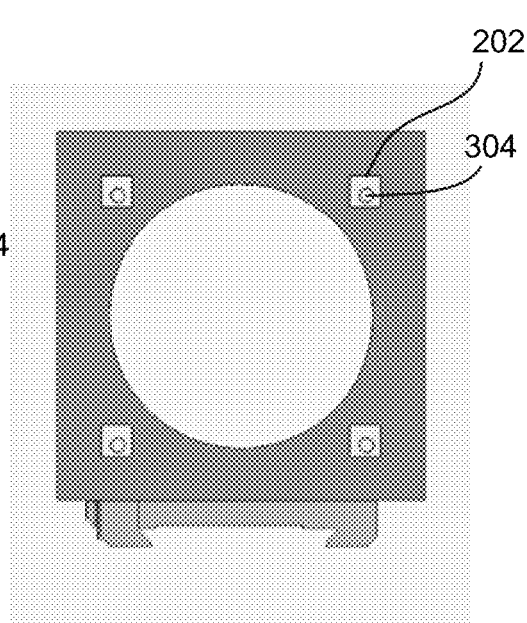
Figure 7B:
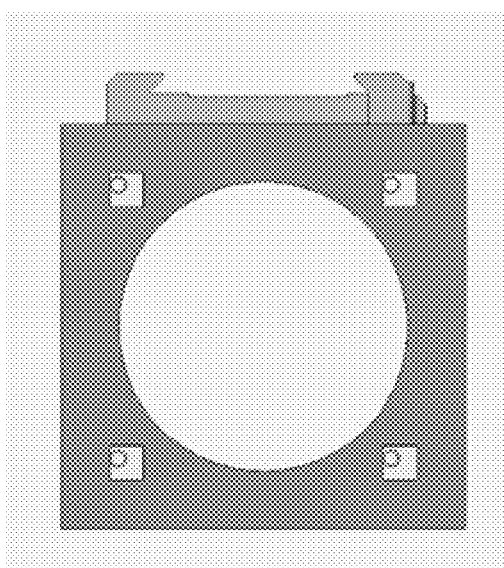
Figure 7D:
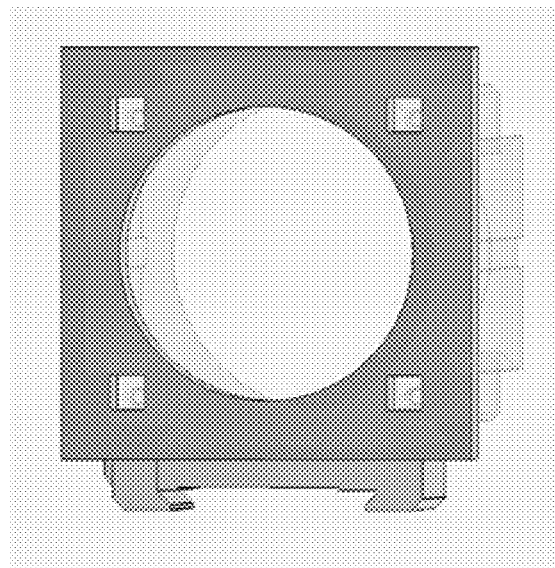

FIGS. 6A, 6B and 6C show examples of an assembly 600 including an optical component (i.e. optics mount holder 102, with lens 108, affixed to alignment channel 104) with an attached adjustment device 500, according to some embodiments. The micrometer assembly 500 may be readily and easily attached to and removed from to the top of the alignment channel to precisely position a lens in the x-y proper position to center it in the optical beam. The adjustment unit 500 may be attached to the top of the alignment channel with a locking clamp 602.

In FIGS. 6A-C the locking screws (e.g. screws 204 shown in FIG. 2) are shown withdrawn from the optics mount holder. During the alignment process, the screws are loosely tightened. Once the optical alignment is completed, the screws are firmly tightened into the alignment channel preventing any further movement of the lens. The adjustment device 500 may then be disconnected and withdrawn from the alignment channel.

FIG. 6C illustrates the assembly including the alignment channel, the optics mount holder and adjusting device as shown in FIGS. 6A-B, but without a lens being attached to the optics mount holder. The optical axis 610 of the lens 108 is also shown.

FIGS. 7A-7D illustrate the oversize holes 202 surrounding the opening 206 of an optics mount holder 102 in relation to the corresponding threaded holes 304 on the alignment channel 104. The four drawings illustrates different positions of the optics mount holder 102 in relation to the alignment channel 104. The different positions (e.g., as that illustrated in FIGS. 7A-D) may be obtained by either manually or using an adjustment device such as device 500 moving the optics mount holder in the x and/or y direction parallel to the surface of the alignment channel to which it is loosely affixed. As also noted elsewhere in this document, the movement is a means by which optical alignment is achieved for the optical components.

Figure 8:
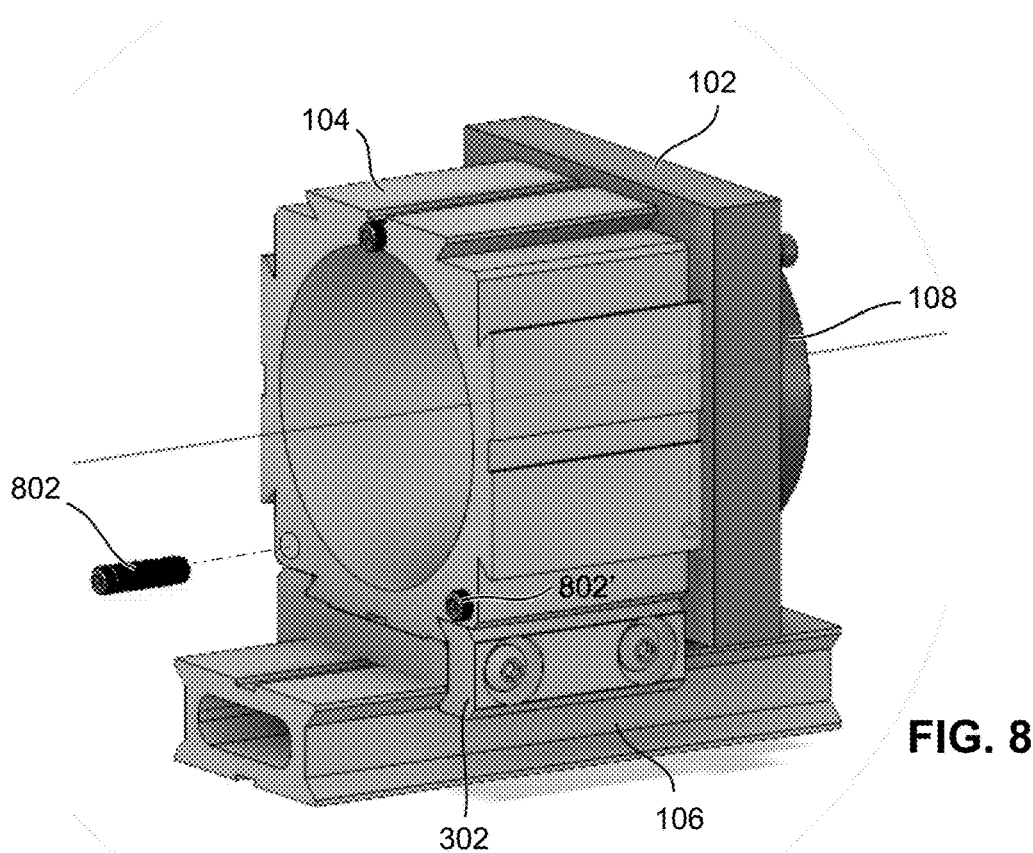
FIG. 8 shows an example tip and tilt lens holder according to some embodiments.

FIG. 8 illustrates a tip and tilt configuration capability according to some example embodiments. In some embodiments, the alignment channel may have one or more holes for receiving a screw positioned on the surface opposite from the surface to which the optics mount holder is loosely affixed. These holes may be in addition to the holes, if any, for affixing an optics mount holder to the surface of the alignment channel.

In the example illustrated in FIG. 8, the alignment channel 104 has an optics mount holder 102 loosely affixed to the alignment channel surface on one side of the alignment channel's hollow tunnel (e.g., hollow tunnel 310) and three screw holes on the opposite surface. It is also illustrated in the figure that a bolt or screw 802 (e.g. fine pitch ball end screws) can be inserted from one side of the alignment channel 104 so that it pushes against the loosely attached optics mount holder on the other side of the alignment channel. When the screw 802, directly or indirectly, pushes the optics mount holder, it tilts the holder away from the alignment channel, incurring a non-perpendicular angle of the holder with respect to the optical axis. When the optics mount holder 102 tilts, the optics 108 (e.g., a lens) attached to it also tilts to the same degree thereby changing the direction of its optical axis. By configuring the alignment channel so that the pushing can be done at more than one location, a highly flexible tilting capability can be achieved.

Figure 9:
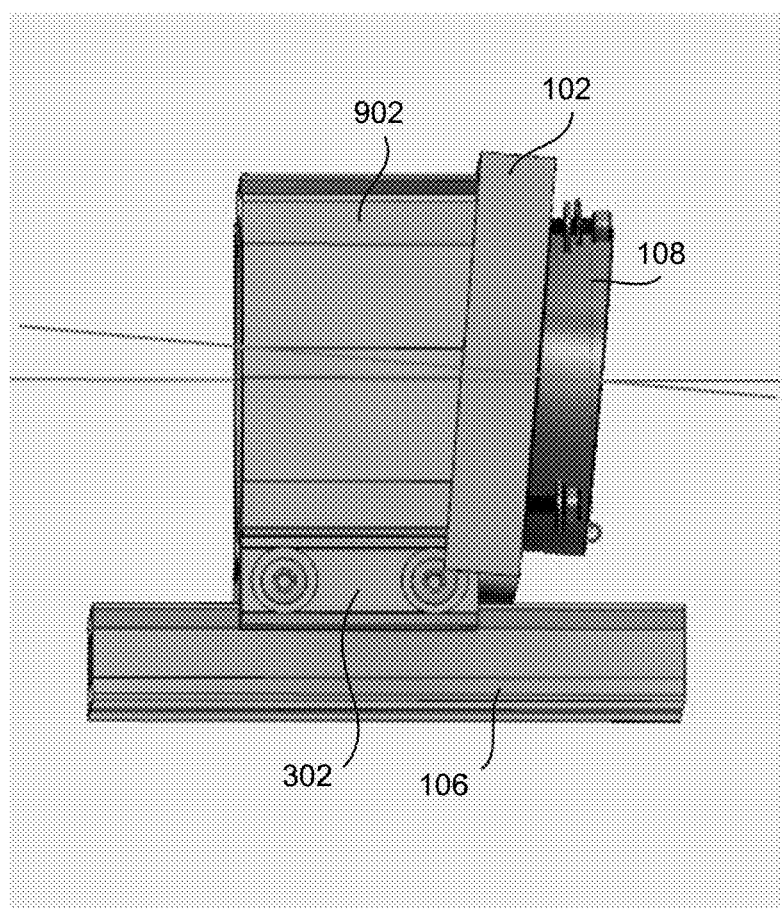
FIG. 9 shows a tip and tilt lens holder achieved by an angled surface of an alignment channel according to some embodiments.

FIG. 9 illustrates another technique by which tilt can be configured in some embodiments. The alignment channel 902, has one surface machined to a particular angle, so that the surfaces at the two ends of the hollow tunnel are not parallel to each other. This is an example of modifying the angle of the mounting surface of the alignment channel. Alternately, the plan parallelism of the optics mount holder could be modified to also change the direction of the optical axis away from the normal. One of the surfaces of the alignment channel is precision machined at an angle to purposely mount the optic at a specified angle still allowing adjustment of the x-y position by movement of the optics mount holder in the x-y direction.

Figure 10A:
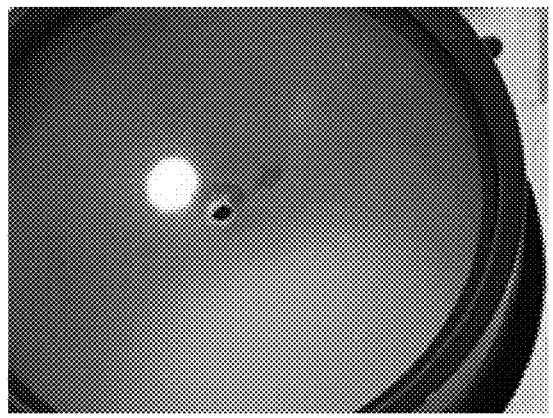
FIG. 10A-10C illustrates an example alignment progression according to some embodiments.
Figure 10B:
Figure 10C:
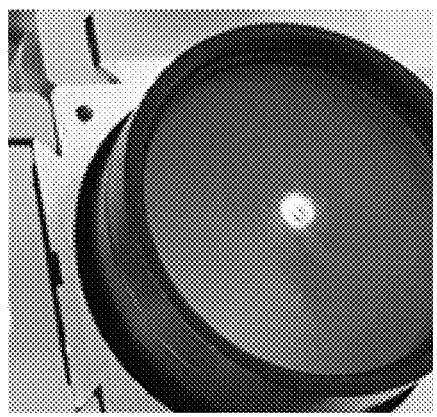

FIGS. 10A-C illustrate an example of the effect achieved during the alignment process according to some example embodiments. A laser beam represents the optical axis of the system to which an optic is to be aligned. A ground glass alignment target mounted on a lens tube attached to an optics mount holder mounted on the other side of an alignment channel is shown, simulating the optic to be aligned. It is seen that the progressive X-Y movement of the lens tube attached to the holder enables the target to be aligned directly over the laser, simulating aligning an optic's optical axis over the system optical axis.

Figure 11:
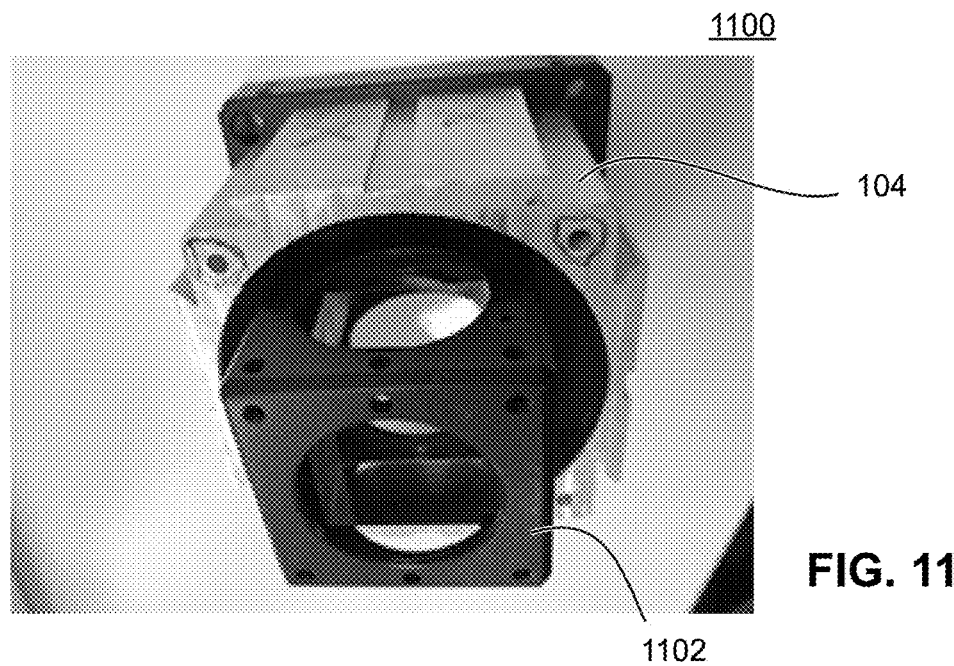
FIG. 11 an example of certain optical components being placed inside an alignment channel according to some embodiments.
Figure 12A:
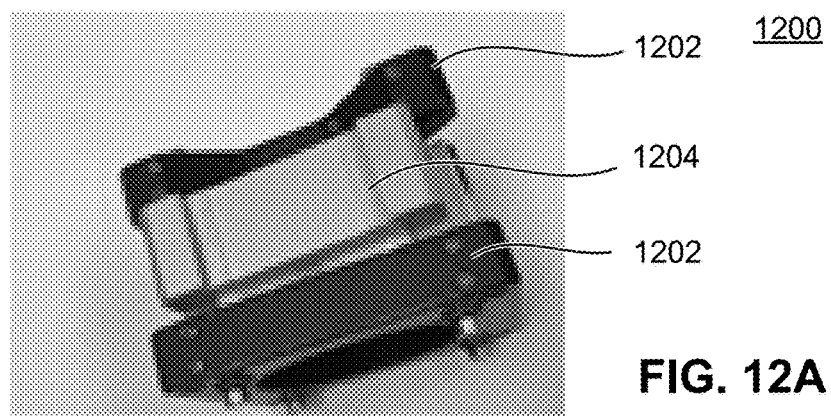
FIGS. 12A-12D illustrate views of an alignment channel with optics mount holders attached on either side, according to some embodiments.
Figure 12B:
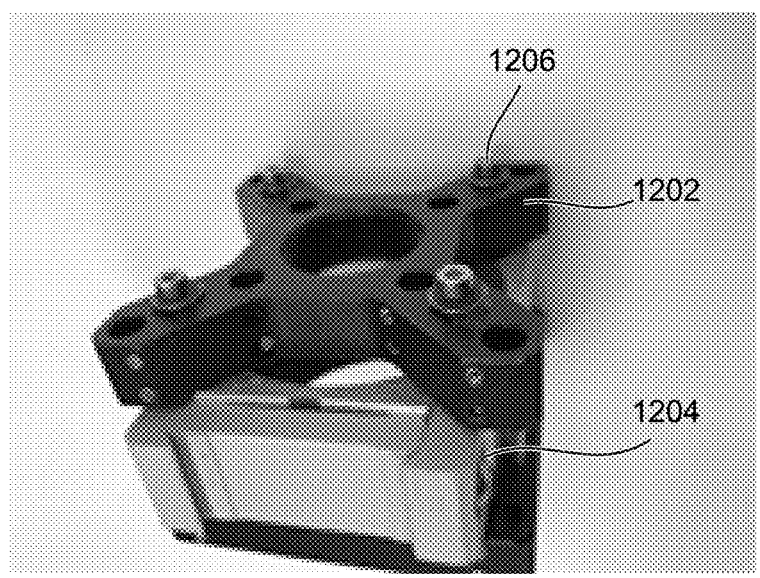
Figure 12C:
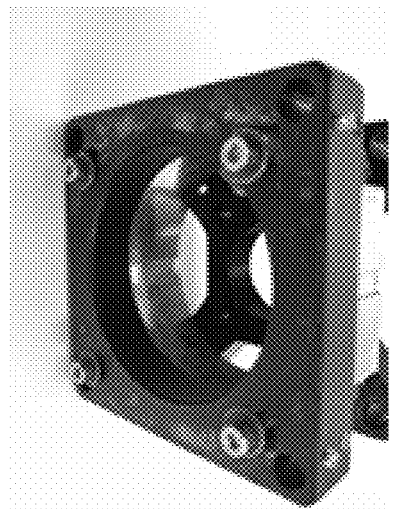
Figure 12D:
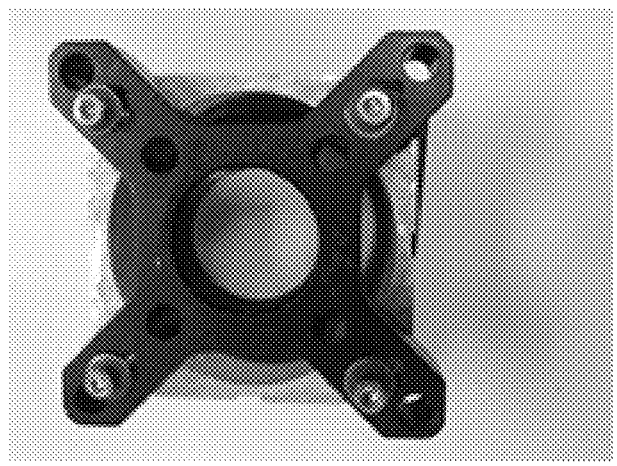

FIG. 11 illustrates an optical component 1100 which includes an alignment channel 104 with another optic 1102 being inserted into the alignment channel's hollow tunnel. A beam splitter cube mounted in the alignment channel is shown. The alignment system allows combining prior art components with the new optical components.

FIGS. 12A-D illustrate examples of an alignment channel 1204 having optics mount holders 1202 and/or 1206 mounted on each end of its hollow tunnel. The figures also illustrate two different shapes of optics mount holders 1202 and 1206.

Figure 13A:
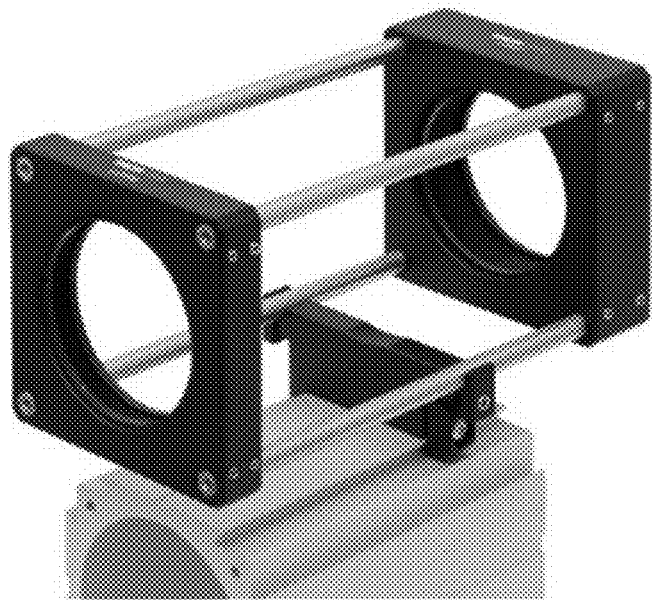
FIGS. 13A-13B illustrate conventional optics mount holders and mounts attached to an alignment channel according to some embodiments.
Figure 13B:
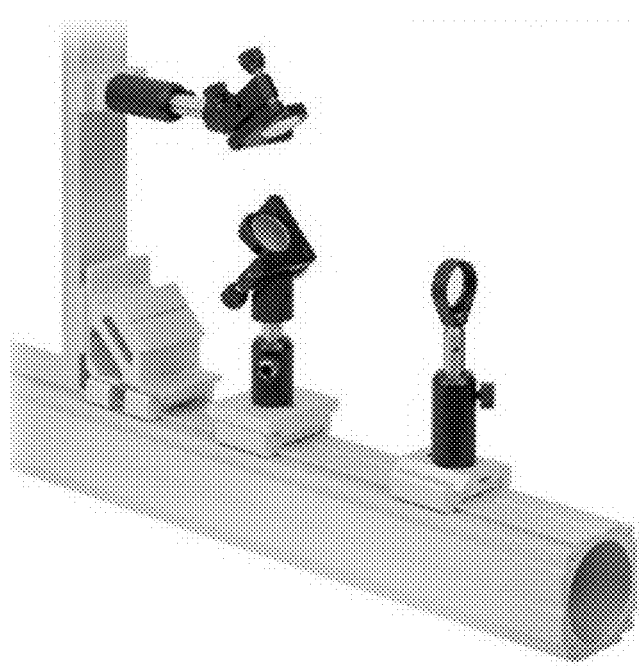
Figure 13C:
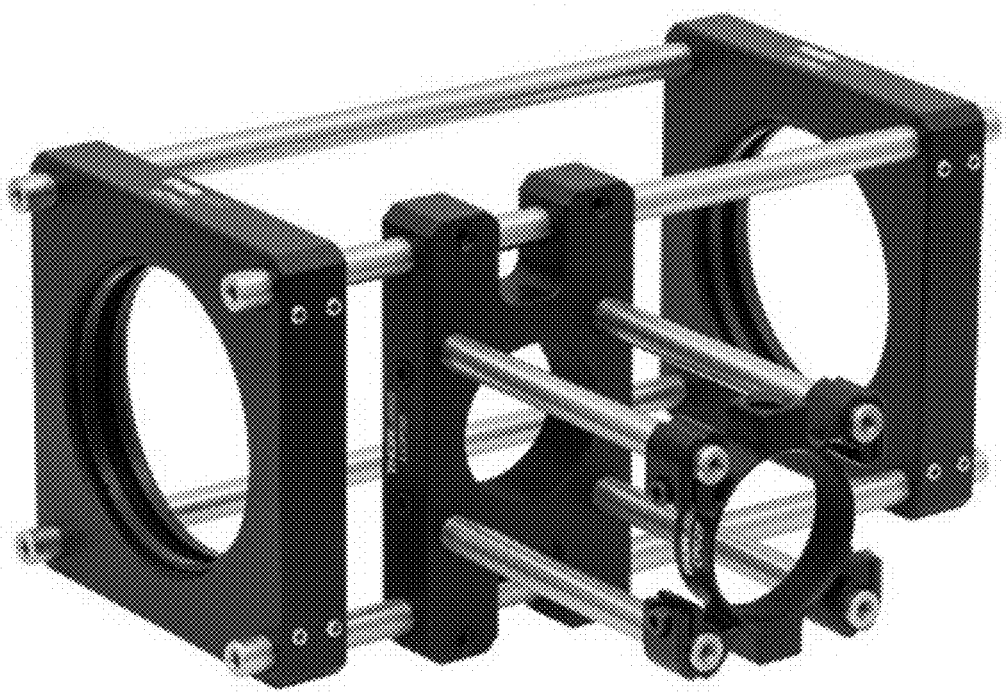
FIG. 13C illustrates a conventional optical mount system.
Figure 13D:
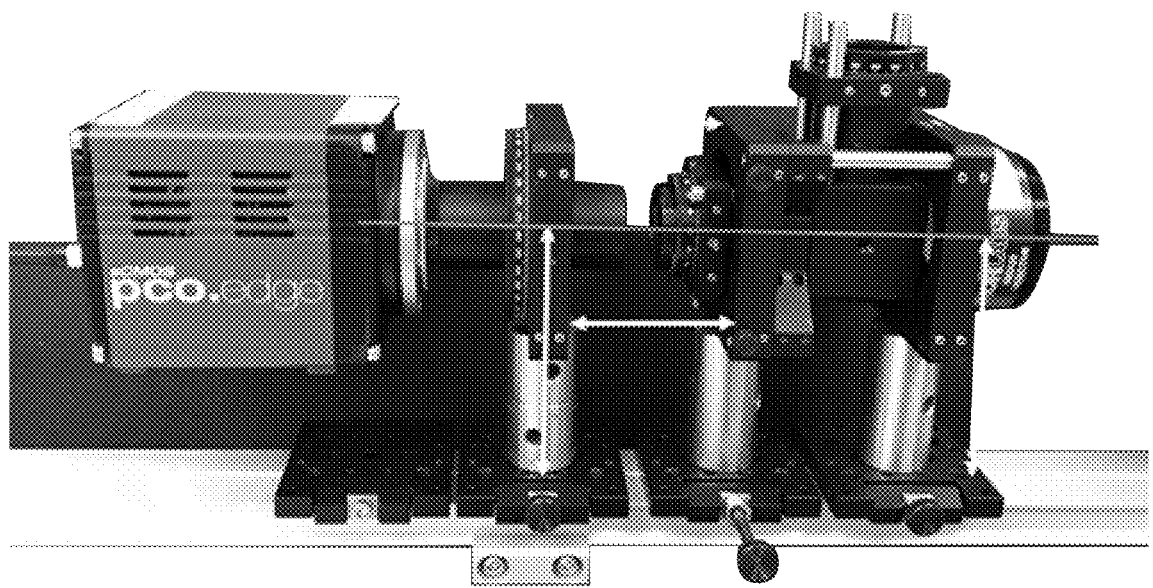
FIG. 13D illustrates an example optical system that uses conventional optical alignment and configuration.

FIGS. 13A-13D show example conventional optical components. FIG. 13A illustrates a conventional optical component in which lens mounts are connected by 6 mm rods. Flexure in the rods may prevent high resolution alignment. FIG. 13B illustrates a conventional optical apparatus that has post-mounted optics mounted on a rail carrier. Precise height and x-y alignment in such optical apparatuses is challenging and is hard to adjust and maintain accurately. FIG. 13C illustrates another conventional optical component with optics connected by rods in a manner similar to that shown in FIG. 13A. Once again it is difficult to keep all components plane parallel due to flexures or deformations in the rods, or due to differences in the locking screw holes by which the optics mount plates are affixed to the rods, and there is no option for performing x-y alignment unless special optics mounts are added. It is common that optics require centration, either in use in optical setups or during manufacture. Even centered optics, when mounted in holders such as show in FIGS. 13A-D, are likely to not be precisely aligned because of variation in the stability of these mechanical components. As shown in FIG. 13D, in this example of optics for a camera system using the conventional alignment and configuration, it is nearly impossible to mount optics plane parallel to one another and at the exact same precise height above the optics rail. The round posts connect the optic holders to the black rail mounts at the bottom, and these posts are attached to both the optic holders and the rail mounts in a more or less randomly threaded screw attachment. It is difficult to screw the posts into the rail mounts and holders with sufficient precision to assure that any two or more holder/post/rail mount assemblies will have holders that are plane parallel to each other. Even if this were possible, it does not allow to adjust for deviation of centration of optical elements.

A technique for incoherent holography invented by one of the present inventors in 2006 [U.S. Pat. No. 8,542,421; Opt. Lett. 32, 912-914 (2007)] is dubbed FINCH for Fresnel Incoherent Correlation Holography. Incoherent holography, a class of holography that includes FINCH and other methods is a technique for creating holograms from the interference of two copies of the same image, or from any single EM radiation wave that is split into two copies, and has been demonstrated using polarization-sensitive optical elements (PSOEs) such as SLMs and liquid crystal Fresnel and GRIN lenses. FINCH creates holograms from an object emitting incoherent light in a single beam system by self-interference from two spherical waves originating from the object. The inventors, as described in U.S. patent application Ser. No. 15/588,096, have discovered that the simultaneous usage of the multiple focal lengths of birefringent lenses can be very advantageous to create very high quality holograms that can reveal the three dimensional information of objects. Birefringent lens based embodiments of the invention can be applied to many forms of holography including FINCH and operates in an electrically independent manner with optical characteristics that yield unmatched holographic image quality which exceeds the performance of standard imaging methods. Furthermore, in addition to holographic imaging applications, the embodiments also enhance and simplify other forms and uses of holography and interferometry.

Figure 14:
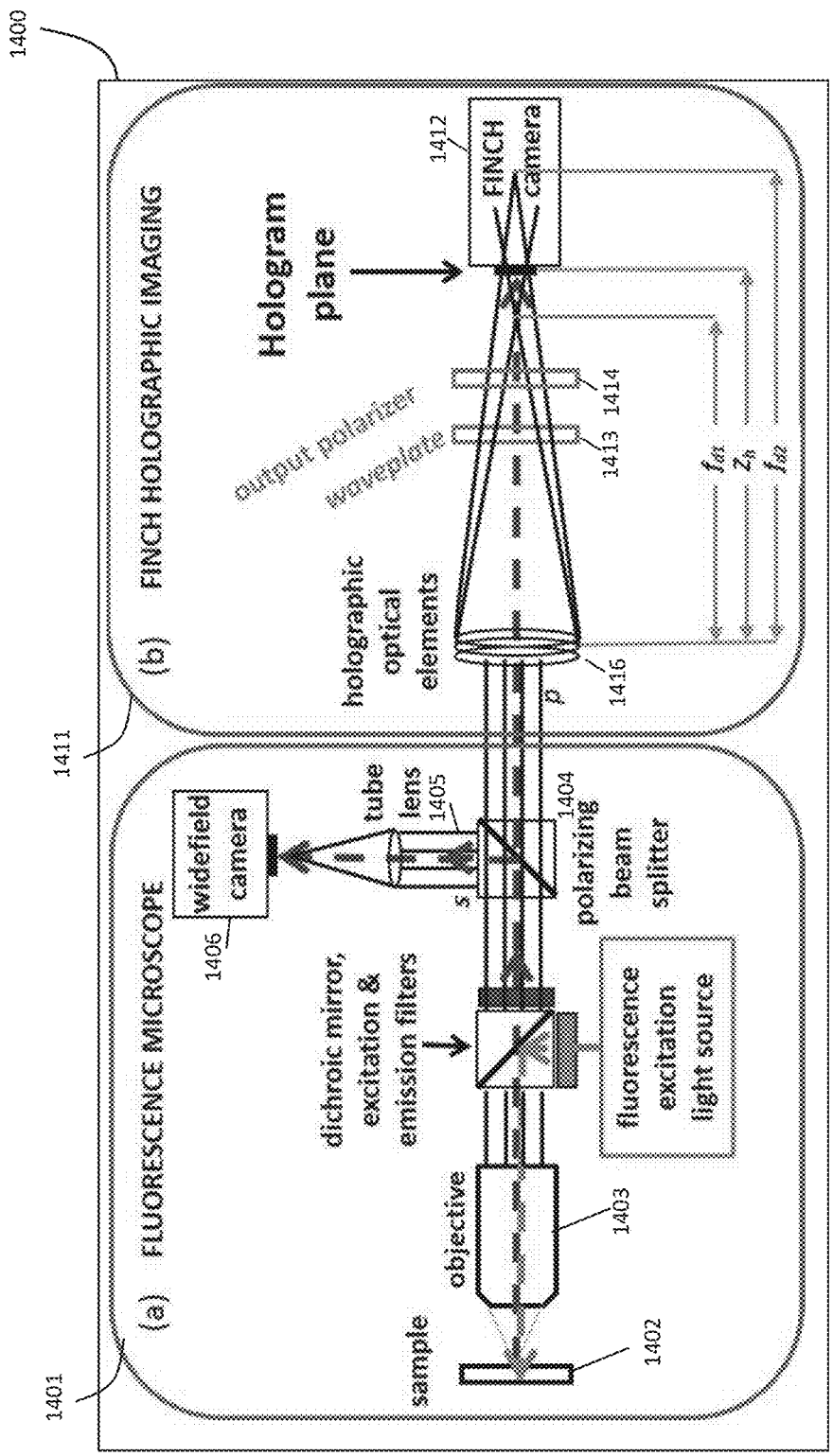
FIG. 14 illustrates an example optics arrangement that can be implemented in the microscope shown in FIG. 1, according to some embodiments.

FIG. 14 schematically illustrates a FINCH microscope 1400 according to some example embodiments. In (a) 1401, a standard fluorescent microscope arrangement in which fluorescent light emitted from a sample 1402 in the microscope is shown. The fluorescent light emitted from the sample passes through an infinity corrected objective 1403, after which point it is split by a beam splitter 1404 into two polarized beams. The s polarization is directed through a microscope tube lens 1405 and the image is captured on the widefield camera 1406 as in a classical microscope. In (b) 1411, beam splitting into two orthogonally polarized beams typical of a FINCH hologram forming system configured with spatial light modulator (SLM) based or Gradient Refractive Index (GRIN or TLCGRIN) lens based or a birefringent crystal lens based interferometer is shown. The emitted light propagates through the objective and a polarizing beamsplitter to an optical train that applies different spherical phases (focusing power) to different polarization components of the light beam, creating a pair of co-propagating differentially focused beams with focal lengths fd1 and fd2. The beams propagate until their interference is recorded at the ideal hologram plane located at distance zh. The detector may be a CCD, CMOS or other camera or image capture device as well as a point detector or solid-state device such as an avalanche photodiode. Optionally the waves may pass through a variable phase shifter and a polarizer. To reconstruct a point or image and provide the basis to remove bias and the twin image in holography, the detector captures two or more raw holograms, in which the phase of one of the beams is set to differ by a predetermined amount in subsequent raw holograms, to allow for the recovery of the complex hologram that fully captures the phase characteristics of the original EM source. Following the recording of a set of holograms used to recreate the complex field at the recording plane, a final processed image is calculated by Fresnel propagation and a subsequent deconvolution. The p polarization is directed through holographic optical elements 1416 which create holograms that are captured on the FINCH camera 1412. The phase of the hologram can be changed by an optional polarization sensitive variable waveplate 1413 if the phase shifting holographic method is used. Additional contrast can also be obtained by inclusion of an optional output polarizer 1414. Not shown for simplicity is a 4F relay system between (a) 1401 and (b) 1411. The holographic microscope 1400 is further described in U.S. patent application Ser. No. 15/588,096 filed on May 5, 2017, which is hereby incorporated in reference in its entirety.

In the holographic microscope 1400 schematically shown in FIG. 14, the objective 1403, polarizing beam splitter 1404, holographic optical elements 1416, etc. all must be precisely and permanently centered in the system. Any misalignment may result in reduced quality of the resulting holographic representation of the sample 1402. According to some embodiments, the holographic microscope 100 shown in FIG. 1 comprises the optics arrangement for generating a hologram as shown schematically in FIG. 14 (the path in FIG. 14 for generating the widefield image is not shown in FIG. 1). That is, according to an embodiment, the holographic microscope 100 comprises at least the optical components in the optical path for forming a holographic image (e.g., objective 1403, polarizing beam splitter 1404, holographic optical elements 1416, waveplate 1413, output polarizer 1414) and the camera 1412 being arranged on the optical rail 106.

In the holographic microscope 100, a sCMOS camera 111 is depicted in the left. Camera 111 may correspond to the camera 1412 (which is depicted at the right hand side of FIG. 14) that captures the electromagnetic interference from which the holographic representation is generated. In system 100 the optical component comprising the alignment channel 104*b* includes a lens attached optics mount holder which may correspond to a holographic optical element 1416 shown in FIG. 14. Specifically, a birefringent lens (part of the holographic optical elements 1416) may be attached to an optics mount holder affixed to the alignment channel 104*b*. The optics 110 may form the birefringent compensating plate, with the phase plate and the output polarizer nearby. Optics mount holder 102*b* may be holding a lens corresponding to a birefringent compensating plate in the system of FIG. 14. Optics mount holder 102*a* holds lens 108 which may correspond to the waveplate 1413 in FIG. 14. Alignment channel 104*a* and affixed optics mount holders may corresponding to optics including output polarizer 1414 in FIG. 14. The polarizing beam splitter 1404 (or a corresponding polarizer), the dichroic mirror and the objective 1403 may not be visible in FIG. 1 and is beyond alignment channel 104*b*.

According to some embodiments, during operation of the holographic microscope 100, two or more holograms of differing phase factors are recorded; these are termed the raw holograms. For example, the camera 111 may be used to record the raw holograms in the form of electromagnetic interference. The raw holograms are then combined by at least one processor of a computer which receives or accesses the raw holograms. The holograms are combined mathematically by a process termed superposition, which enables the recovery of the object phase information (complex-valued information) from the real-valued raw holograms. An example superposition calculation is below, for three raw holograms:

$$H_F = H_1[\exp(\pm i\theta_3) - \exp(\pm i\theta_2)]$$

$$+ H_2[\exp(\pm i\theta_1) - \exp(\pm i\theta_3)]$$

$$+ H_3[\exp(\pm i\theta_2) - \exp(\pm i\theta_1)],$$

in which $H_F$ is the complex valued hologram, $H_1$, $H_2$ and $H_3$ are the three raw holograms, and $\theta_1$, $\theta_2$ and $\theta_3$ are the phase factors of the raw holograms.

At this point the image data resulting from the superposition is in the form of a complex-valued hologram that contains phase and intensity information of the object; however, this complex hologram is not itself an image, and is the convolution of the object's optical properties with an instrument response function (IRF) that is characteristic of the imaging system. To create an image from the complex hologram, it is necessary to reverse this convolution, which is typically accomplished by convolving the complex hologram with a point spread function (PSF) that is the approximate inverse of the IRF of the imaging system. For an object that has multiple planes in the z dimension, each individual plane will be convolved with a different IRF that corresponds to only the distance of that plane away from the imaging system, and the sum of all of these individual convolutions is recorded as the raw hologram. The superposition process with incorporate all of this information into the complex-valued hologram. Thus each plane that is represented in the complex hologram can only be reconstructed by a PSF calculated for exactly that plane.

To reconstruct the image $s(z_{rec})$ of the object at any plane of a given distance tree, the following reconstruction equation is applied:

$$s(z_{rec}) = H_F * \exp[(ip/lz_{rec})/(x^2+y^2)],$$

in which the * denotes a convolution and in which the exponential term is the PSF.

The reconstructed holographic image is then displayed on a display that is connected to the computer.

In some embodiments, lens 308 may be a thin birefringent lens which may be one of a birefringent Fresnel lens made with solid crystalline material, or a birefringent Fresnel lens made with liquid crystalline material. The thin birefringent lens may include a patterned birefringent solid or liquid crystalline material. The at least one thin birefringent lens includes a nano-structured non-birefringent material, where the birefringent properties are imparted by patterns encoded in the nano-structures. The thin birefringent lens encodes one or more spherical quadratic phase patterns, or phase patterns other than spherical quadratic phase patterns. The thin birefringent lens has a near planar structure. The lens may not be limited to particular type of lens. In some example embodiments, the lens may be a birefringent lens. Some embodiment may include at least one classical lens of the plurality of lenses. Such a classical lens may be arranged to compensate for the chromatic shifts caused by the at least one thin birefringent lens to reduce spreading of an optimal hologram plane. An optical apparatus according to some embodiments may include many different types of optics (e.g., lenses, including objective lenses, tube lenses, birefringent lenses, Fresnel lenses, holographic lenses; polarizers; polarizing beam splitters; standard beam splitters; diffusers; mirrors; optical filters or dichroics; waveplates;

gratings; optical fibers or fiber couplers, etc.) mounted on respective optics mount holders.

An example embodiment provides an optical apparatus comprising a plurality of lenses including a first lens affixed to an optics mount holder which is adjustably affixed to an alignment channel (also referred to as "alignment channel part"). The optical axis of the first lens passes through a hollow area of the alignment channel. The plurality of lenses are configured to: receive electromagnetic radiation from an object (i.e. a sample), where the electromagnetic radiation may be incoherent or coherent light; and transform, by transmission using the first lens, the received electromagnetic radiation to generate two or more differentially modulated electromagnetic waves propagating in a common path. According to some embodiments, the first lens is a birefringent lens, and it provides for the differentially modulated electromagnetic waves to create electromagnetic interference. The electromagnetic interference captured by a camera is used to generate a hologram of the object.

A second lens from the plurality of lenses in the optical apparatus may also be adjustably affixed to the alignment channel by another optics mount holder, such that the first and second lenses are on opposite sides of the alignment channel.

In some embodiments, the first lens may be affixed to the alignment channel with a plurality of adjustable fasteners. At least one of the adjustable fasteners may be a threaded screw positioned in a hole in the optics mount holder, wherein the screw adjustably affixes the optics mount holder to the alignment channel by being driven into a threaded screw hole in the alignment channel, and the clearance screw hole in the optics mount holder is larger than the threaded screw hole in the alignment channel. When the at least one threaded screw is driven into the threaded screw hole to a first depth, the optics mount holder is movable in relation to the alignment channel in a plane parallel to a surface of the alignment channel to which the optics mount holder is attached, and when the at least one threaded screw is driven into the threaded screw hole to a second depth, the optics mount holder is immovable in relation to the alignment channel.

In some embodiments, the optical apparatus may also include a detachable adjusting device attached to the alignment channel and to the optics mount holder, wherein the moving of the optics mount holder is performed by operation of the detachable adjustment device.

The optical apparatus may be a microscope, and wherein said moving of the optics mount holder is performed after positioning the plurality of lenses in accordance with the microscope design. The microscope may be a holographic microscope.

In some embodiments, each of two or more lenses from the plurality of lenses are mounted on respective alignment channel parts with respective optics mount holders, wherein the respective alignment channel parts are affixed to a railing such that optical axes of the two more lenses are aligned with each other.

In some embodiments the alignment channel parts are movable along a rail while maintaining alignment of said optical axes of the two or more lenses.

According to some embodiments, an optical component for use in an optical apparatus comprises: an alignment channel; an optics mount holder; a lens; and a rail. The lens is mounted on the optics mount holder which is adjustably affixed to one end of the alignment channel with a plurality of adjustable fasteners, and the alignment channel is affixed to the railing.

The optical component may also include a second lens affixed to a second optical channel mount holder which is adjustably affixed to another end of the alignment channel with a second plurality of adjustable fasteners.

The optical component may include a second lens inside the alignment channel.

In the optical component, at least one of the adjustable fasteners is a threaded screw positioned in a hole in the optics mount holder and adjustably affixing the optics mount holder to the alignment channel part by being driven into a threaded screw hole in the alignment channel. The clearance screw hole in the optics mount holder is larger than the threaded screw hole in the alignment channel.

When the at least one threaded screw is driven into the threaded screw hole to a first depth, the optics mount holder is movable in relation to the alignment channel part in a plane parallel to a surface of the alignment channel to which the optics mount holder is attached, and when the at least one threaded screw is driven into the threaded screw hole to a second depth, the optics mount holder is immovable in relation to the alignment channel. The first depth may, for example, be a level of tightening (e.g., a loose tightening) the threaded screws such that the optics mount holder can be moved parallel to the surface of the alignment channel to which it is affixed, and, in contrast, the second depth may be at a further level of tightening to the extent that no movement of the optics mount holder is possible.

The movement of the optics mount holder in relation to the alignment channel, when the screws are loosely tightened, includes movement in either x-direction or y-direction.

The optical component may also include a detachable adjusting device attached to the alignment channel and to the optics mount holder, wherein the moving of the optics mount holder is performed by operation of the detachable adjustment device.

In some embodiments, the detachable adjusting device is a micrometer assembly.

In some embodiments, the threaded screws used in the optical component are spring loaded.

In some embodiments, the optical component includes an alignment channel which is configured to receive a bolt inserted from another side of the alignment channel such that adjustments to the bolt varies an amount of tilt of the optics mount holder in relation to the surface of the alignment channel to which the optics mount holder is affixed by the plurality of fasteners.

The optical component may include a plurality of alignment channels affixed to the railing such that optical axes of respective lenses that are held in place by the plurality of alignment channels are in alignment.

In some embodiments, respective individuals of the plurality of alignment channels in the optical component are of different widths.

The optical component may also include a detection device to determine the deviation from the desired position of the optic that is undergoing alignment. The detection device may be a digital camera, a beam profiler, or a wave-front sensor.

Figure 15:
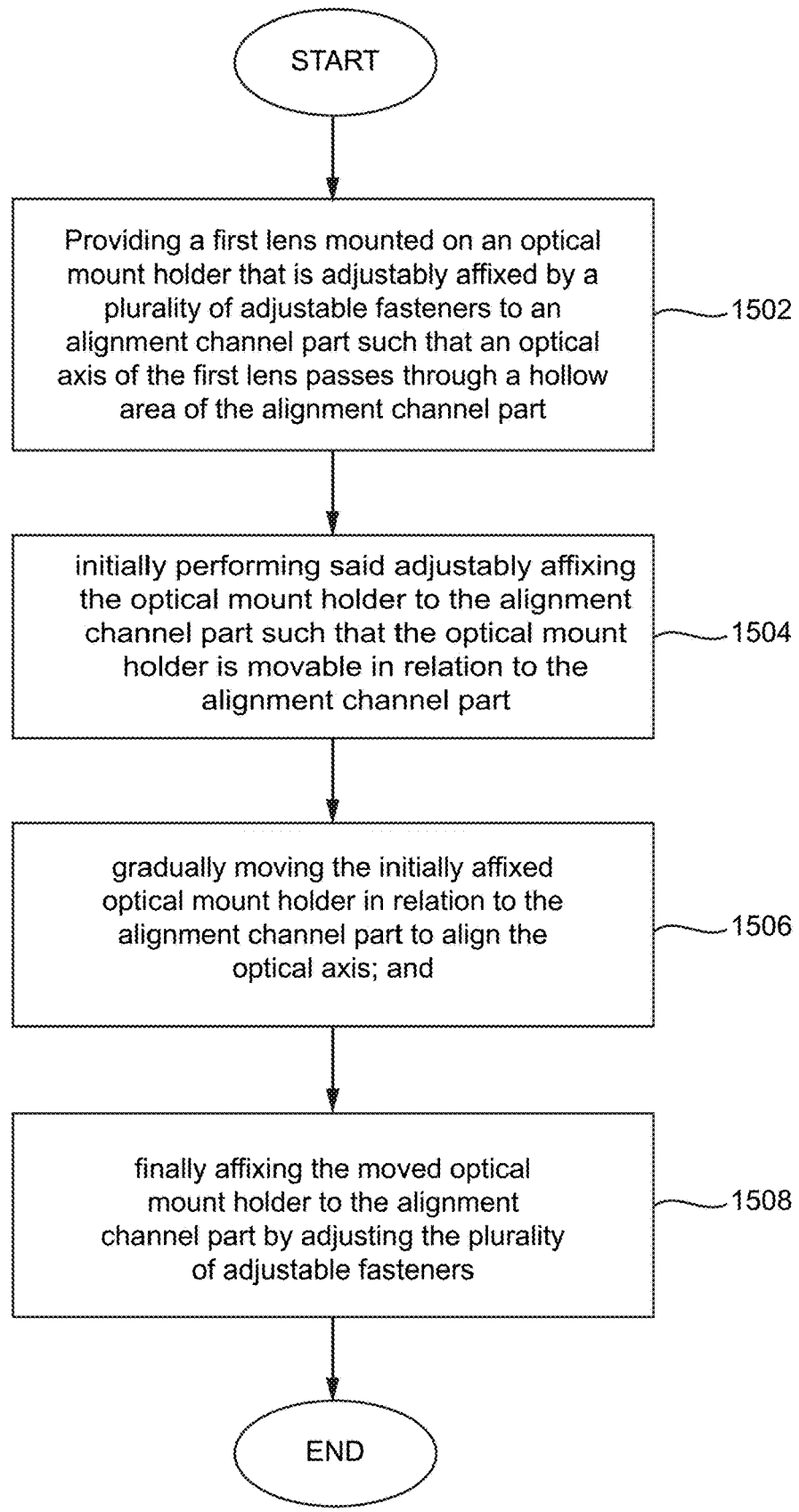
FIG. 15 illustrates a flowchart of an alignment and configuration process according to some example embodiments.

According to some embodiments, a method 1500 (see FIG. 15) of aligning an optical system is provided. The method includes providing, at operation 1502, a first lens mounted on an optics mount holder that is adjustably affixed by a plurality of adjustable fasteners to an alignment channel such that an optical axis of the first lens passes through a hollow area of the alignment channel is provided. The method also includes, at operation 1504, initially performing the adjustable fixation of the optics mount holder to the alignment channel such that the optics mount holder is movable in relation to the alignment channel; at operation 1506, gradually moving the initially affixed optics mount holder in relation to the alignment channel to align the optical axis; and, at operation 1508, finally affixing the moved optics mount holder to the alignment channel by adjusting the plurality of adjustable fasteners to the extent that no further adjustment of the optics mount holder relative to the alignment channel piece is possible.

The method further comprises providing a light beam through the hollow area of the alignment channel, wherein the gradual moving of the optics mount holder is performed until the lens optical axis is aligned with the light beam. The gradual moving includes moving the optics mount holder in an x-direction and/or y-direction. The gradual moving may be performed using a micrometer assembly that is affixed to the optics mount holder and to the alignment channel.

The method may further include detaching the micrometer assembly after the gradually moving is complete.

In some embodiments, the method may also include, to perform the gradual moving, adjusting a bolt for tilting the optics mount holder in relation to a surface of the alignment channel to which it the optics mount holder is attached.

The method may further include the alignment of the lens and optics mount holder being monitored during the alignment procedure by use of a detection device, where the monitoring is performed for the purpose of measuring the deviation of the adjusted alignment from the desired alignment. The detection device may include a digital camera, and the use of the detection device may include capturing an image that measures the deviation of the lens and optics holder away from the desired alignment.

Numerous modifications and variations of the present invention are possible in light of the above teachings. In particular, in any case in which a lens is discussed, the teachings may also be applied to any other optical device. It is therefore to be understood that within the scope of the appended claims, the invention may be practiced otherwise than as specifically described herein.

When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An optical component for use in an optical apparatus, the optical component comprising:
    an alignment channel part;
    an optics mount holder;
    a lens;
    a second lens; and
    a rail,
        wherein the lens is mounted on the optics mount holder which is adjustably affixed to one end of the alignment channel part with a plurality of adjustable fasteners, and wherein the alignment channel part is affixed to the rail, and
        wherein the second lens is affixed to a second optical channel mount holder which is adjustably affixed to another end of the alignment channel part with a second plurality of adjustable fasteners.

2. The optical component according to claim 1, wherein at least one of the adjustable fasteners is a threaded screw positioned in a hole in the optics mount holder and adjustably affixing the optics mount holder to the alignment channel part by being driven into a threaded screw hole in the alignment channel part, and wherein a clearance screw hole in the optics mount holder is larger than the threaded screw hole in the alignment channel part.

3. The optical component according to claim 2, wherein, when the at least one threaded screw is driven into the threaded screw hole to a first depth, the optics mount holder is movable in relation to the alignment channel part in a plane parallel to a surface of the alignment channel part to which the optics mount holder is attached, and when the at least one threaded screw is driven into the threaded screw hole to a second depth, the optics mount holder is immovable in relation to the alignment channel part.

4. The optical component according to claim 3, further comprising a detachable adjusting device attached to the alignment channel part and to the optics mount holder, wherein the moving of the optics mount holder is performed by operation of the detachable adjustment device.

5. The optical component according to claim 4, wherein the detachable adjusting device is a micrometer assembly.

6. The optical component according to claim 4, wherein the movement includes movement in either x-direction or y-direction.

7. The optical component according to claim 2, wherein the threaded screw is a spring loaded.

8. The optical component according to claim 7, wherein the alignment channel part is configured to receive a bolt inserted from another side of the alignment channel part such that adjustments to the bolt varies an amount of tilt of the optics mount holder in relation to the a surface of the alignment channel part to which the optics mount holder is affixed by the plurality of fasteners.

9. An optical component for use in an optical apparatus, the optical component comprising:
    an alignment channel part;
    an optics mount holder;
    a lens; and
    a rail,
    wherein the lens is mounted on the optics mount holder which is adjustably affixed to one end of the alignment channel part with a plurality of adjustable fasteners, and wherein the alignment channel part is affixed to the rail,
    wherein the optical component further comprises a second lens inside the alignment channel part.

10. An optical component for use in an optical apparatus, the optical component comprising:
    an alignment channel part;
    an optics mount holder;
    a lens; and
    a rail,
        wherein the lens is mounted on the optics mount holder which is adjustably affixed to one end of the alignment channel part with a plurality of adjustable fasteners, and wherein the alignment channel part is affixed to the rail, wherein the optical component further comprises a plurality of alignment channel parts affixed to the railing such that optical axes of respective lenses that are held in place by the plurality of alignment channel parts are in alignment.

11. The optical component according to claim 10, wherein respective ones of the plurality of alignment channel parts are of different widths.

12. An optical component for use in an optical apparatus, the optical component comprising:
   an alignment channel part;
   an optics mount holder;
   a lens; and
   a rail,
      wherein the lens is mounted on the optics mount holder which is adjustably affixed to one end of the alignment channel part with a plurality of adjustable fasteners, and wherein the alignment channel part is affixed to the rail,
   wherein the optical component further comprises a detection device to determine a deviation from a desired position of an optic that is undergoing alignment.

13. The optical component of claim 12, wherein the detection device is a digital camera.

14. The optical component of claim 12, wherein the detection device is a beam profiler.

15. The optical component of claim 12, wherein the detection device is a wave-front sensor.

\* \* \* \* \*